United States Patent [19]

Thorn

[11] Patent Number: 4,964,623
[45] Date of Patent: Oct. 23, 1990

[54] FLUID FILLED RESILIENT BUSHING

[75] Inventor: Richard P. Thorn, Erie, Pa.

[73] Assignee: Lord Corporation, Erie, Pa.

[21] Appl. No.: 129,614

[22] Filed: Dec. 7, 1987

[51] Int. Cl.$^5$ .............................. F16F 9/10; F16M 7/00
[52] U.S. Cl. .................................. 267/140.1; 248/562
[58] Field of Search ................ 267/217, 219, 259, 35, 267/152, 140.1, 140.5; 248/562, 636; 180/300, 312

[56] References Cited

U.S. PATENT DOCUMENTS

| | | | |
|---|---|---|---|
| 3,147,964 | 9/1964 | Wolf. | |
| 3,642,268 | 2/1972 | Hipsher | 267/57.1 |
| 3,698,703 | 10/1972 | Hipsher | 267/63 |
| 4,121,813 | 10/1978 | Inuzuka | 267/57.1 |
| 4,377,216 | 3/1983 | Ueno | 180/73 |
| 4,535,976 | 8/1985 | Dan et al. | 267/8 R |
| 4,588,174 | 5/1986 | Konishi et al. | 267/140.1 |
| 4,605,207 | 8/1986 | Konishi | 267/57.1 |
| 4,667,942 | 5/1987 | Bitschkus et al. | 267/140.1 |
| 4,690,389 | 9/1987 | West | 267/140.1 |
| 4,693,456 | 9/1987 | Kanda | 267/140.1 |
| 4,753,421 | 6/1988 | Makibayashi et al. | 280/312 X |
| 4,763,884 | 8/1988 | Matsui et al. | 267/140.1 |

FOREIGN PATENT DOCUMENTS

| | | | |
|---|---|---|---|
| 3519016 | 12/1986 | Fed. Rep. of Germany | 267/140.1 |
| 3632612 | 4/1987 | Fed. Rep. of Germany | 267/140.1 |
| 56-63141 | 5/1981 | Japan . | |
| 0144444 | 7/1986 | Japan | 267/219 |
| 0165040 | 7/1986 | Japan | 267/140.1 |
| 0180036 | 8/1986 | Japan | 267/140.1 |
| 0270533 | 11/1986 | Japan | 248/636 |
| 0274131 | 12/1986 | Japan | 267/219 |

OTHER PUBLICATIONS

Wallace C. Flower, "Understanding Hydraulic Mounts for Improved Vehicle Noise, Vibration and Ride Quality", 5/15/85.
Marc Bernuchun, "A New Generation of Engine Mounts", SAE Technical Paper Series 840259, 2/27/84.

Primary Examiner—Andres Kashnikow
Assistant Examiner—Richard Potosnak
Attorney, Agent, or Firm—Philip P. McCann; James W. Wright

[57] ABSTRACT

A fluid filled resilient bushing assembly for vibration control in the radial and axial directions or combinations thereof, particularly adapted for use in a suspension system, which comprises an elongate inner rigid member and an elongate outer rigid sleeve member, a resilient member interposed between the inner and outer members. The resilient member together with the outer member defines two circumferentially and axially-spaced chambers and a restricted passageway connecting the chambers. The chambers and passageway contain an incompressible fluid. By axially and circumferentially spacing the chambers, the desired damping in the axial and radial direction is obtained.

12 Claims, 1 Drawing Sheet

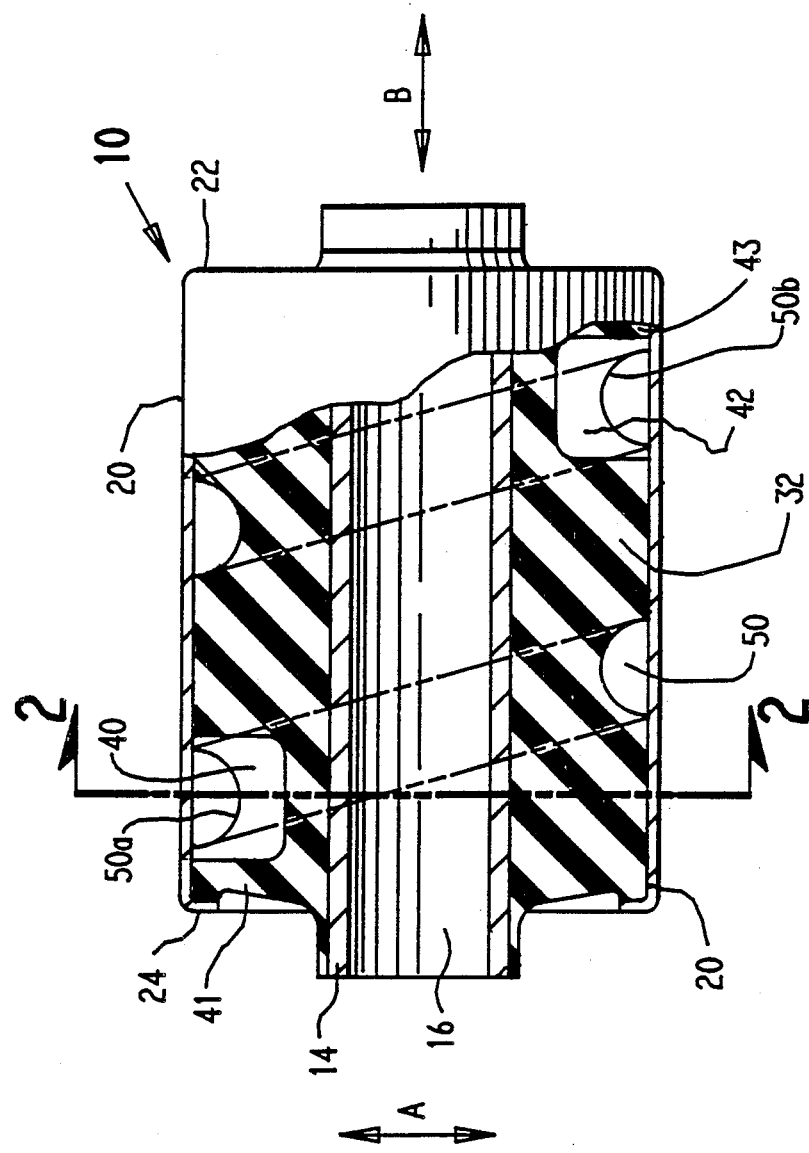
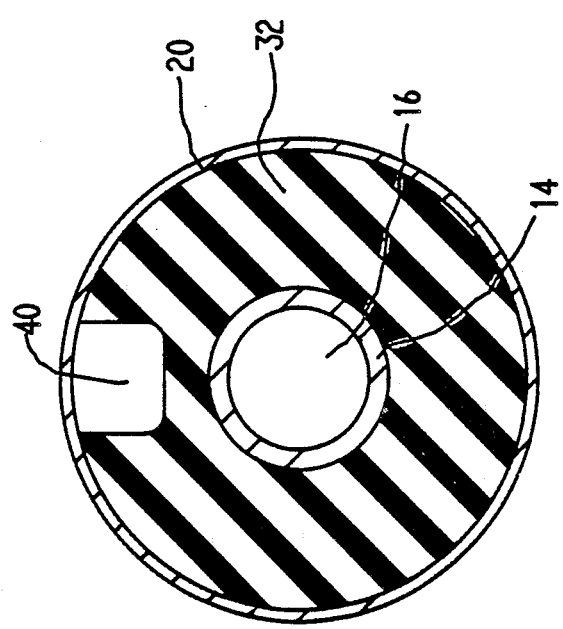

FLUID FILLED RESILIENT BUSHING

FIELD OF THE INVENTION

The present invention relates to fluid filled resilient bushing assemblies, and more particularly the present invention relates to fluid filled resilient bushing assemblies having both radial and axial damping.

BACKGROUND OF THE INVENTION

Bushing assemblies are generally located at a connecting joint between a base member and a member movable about the connecting joint in such applications as machinery, airplanes, boats and vehicular transportation. Generally, the base member has two ends, one end affixed to a frame and a second end having a mating member forming a part of a housing of the connecting joint. The member movable about the connecting joint also has two ends, one end affixed to an element movable with respect to the frame, and a second end having a mating member which along with the mating member of the base member forms the housing of the connecting joint. The bushing assembly is affixed within the housing of the connecting joint and serves to control forces and accommodate movement from the movable element.

Various forms of movements occur at the connecting joint including static and dynamic vibratory motions which induce radial and axial motions at the connecting joint. It is desirable that the bushing assembly be capable of damping such vibratory motions thereby reducing the transmittal of such vibratory motions to the base member while accommodating all static deflections.

Bushing assemblies are widely used in vehicular transportation such as joints in primary suspension assemblies for automobiles. One concern in automobiles is the reduction of vibrations induced from the road surface and isolation of the passenger compartment from such vibrations. Such vibrations may comprise a range of amplitudes and frequencies and motions in various directions. Relative to the road, the vibratory motion may be vertical, such as up and down motion induced by the road, or it may be horizontal, such as the sway motion incurred in cornering of a car. Automotive suspension systems are designed to reduce such vibrations. A front end suspension system is made up of components including various arms, rods, links, etc. intermediate of the frame and the wheel assembly of the car. Generally, an elongated arm extends from the wheel assembly, and another arm extends from the frame which are connected together at a connecting joint having a bushing assembly.

The most common type of bushing assembly is a rubber bushing. Rubber bushings generally comprise annular elongate inner and outer members with elastomer disposed therebetween. Such bushings are used to control and transmit movement but have limited capability in damping vibrations. Damping of vibrations is attained by dissipating the energy of the vibratory motion. The damping provided by elastomers is a function of the hysteresis property of the elastomer. In general, rubber bushings can be said to provide little damping.

One form of bushing assembly which can provide improved damping are fluid filled bushings. Fluid filled bushings generally include a cylindrical elongate inner rigid member, an elongate outer rigid sleeve member concentrically disposed and radially spaced from the inner member and a resilient means disposed between the inner member and outer sleeve member wherein the resilient elastomeric means defines a pair of circumferentially spaced and diametrically opposed fluid filled chambers fluidly connected by an elongate restricted passageway. In operation, in response to vibratory motions along the radial direction of the bushing assembly between the inner member and outer sleeve member, fluid is displaced from one chamber via the restricted passageway to the second chamber in a direction opposite to the vibratory motion. In particular, when a first chamber is contracted, the fluid is displaced therefrom through the restricted passageway to an expanding second chamber. In the reverse cycle of the vibratory motion, when the first chamber is expanding and the second chamber is contracting, the fluid is reversibly moved through the restricted passageway. As can be seen, an oscillatory motion of the fluid is generated within the restricted passageway between two chambers diameter about a radial direction.

The restricted passageway confines movement of the fluid. The oscillatory fluid in the restricted passageway creates a fluid resistance and/or a mass or inertia resistance to the pumping forces of the chambers resulting in damping of the vibratory motions along the radial direction. The chambers may be circumferentially spaced to provide damping along more than one radial direction in directions other than that which the chambers are located. Intermediate of the chambers, the bushing assembly comprises a solid rubber member, extending along the axial direction of the bushing assembly wherein these sections of the bushing assembly have the characteristics of the rubber bushing with respect to vibratory motion. Such fluid filled bushing assemblies provide damping limited to the radial direction along which fluid chambers are located. Damping is not provided along the axial direction of the bushing assembly.

An example of such a fluid filled bushing is disclosed in U.S. Pat. No. 3,642,268. The bushing there disclosed utilizes hydraulic fluid displaceable between two diametric chambers via a restricted orifice. The chambers are located in the bushing along a first radial direction whereas along a second radial direction perpendicular to the first radial direction is a solid rubber member which extends along the axial direction of the bushing. Such a fluid filled bushing exhibits low stiffness and high damping along the first radial direction dependent on the flow characteristics between the chambers and the fluid properties as described heretofore and high stiffness and low damping along the second radial direction and the axial direction.

Vibratory motions transmitted through bushing assemblies are not limited to motions in radial directions of the bushing but also include vibratory motions along the axial direction of the bushing assembly. Although the movement along the axial direction is controlled, the bushing assemblies described above provide limited damping of axial vibratory motions.

A fluid filled bushing for damping vibrations in both the radial and axial direction is disclosed in U.S. Pat. No. 4,667,942. The bushing therein disclosed utilizes hydraulic fluid displaceable between two sets of two chambers, the first set of two chambers provides damping in the axial direction and the second set of two chambers provides damping in the radial direction. The two sets of two chambers are fluidly interconnected via two restricted passageways. Vibratory motions in the radial direction are dampened by the transfer of fluid between the first set of two chambers via the two restricted passageways and vibratory motions in the axial direction are dampened by the transfer of fluid between the second set of two chambers via the two restricted passageways. Although this bushing assembly provides damping in the radial and axial direction, it is of complicated design. Furthermore, damping provided by such a bushing is diminished when the vibratory motion is changing from between the axial and radial directions.

There is a need for a fluid filled bushing assembly of less complicated design which can provide damping to vibratory motion in both axial and radial direction.

OBJECTS OF THE INVENTION

With the foregoing in mind, a primary object of the present invention is to provide an improved fluid filled resilient bushing assembly particularly suited for connecting relatively moveable components.

Another object of the present invention is to provide a novel fluid filled resilient bushing assembly providing damping of vibratory motion at excitations of various amplitudes and frequencies in the axial direction and radial direction or combinations thereof.

Another object of the present invention is to provide a novel fluid filled resilient bushing assembly of relatively uncomplicated design.

Another object of the present invention is to provide a novel fluid filled resilient bushing wherein damping of vibratory motion in the radial and axial direction is provided by a pair of axially spaced chambers interconnected by a unique restricted passageway.

SUMMARY OF THE INVENTION

More specifically, in the Present invention a fluid filled resilient bushing assembly is described having an elongate inner rigid member, an elongate outer rigid sleeve member disposed about and radially spaced from the inner member to define a space therebetween. A resilient means is disposed about the inner member between the inner and outer members. The resilient means defines at least two spaced chambers interconnected by a restricted passageway wherein the two chambers are axially and circumferentially spaced. An incompressible fluid is contained in the spaced chambers and restricted passageway. Such a fluid filled resilient bushing assembly provides damping of vibratory motion in the axial direction and radial direction or combination thereof. In one embodiment, the two spaced chambers are interconnected by a spirally disposed restricted passageway.

BRIEF DESCRIPTION OF THE DRAWINGS

The foregoing and other objects, features and advantages should become apparent from the following description when taken in conjunction with the accompanying drawings, in which:

FIG. 1 is a partial longitudinal sectional view taken along the mid axial plane of a bushing assembly of the present invention showing the circumferentially and axially spaced chambers and spirally disposed restricted passageway; and FIG. 2 is a view taken along lines 2—2 of FIG. 1 showing a cross sectional view of one chamber.

DESCRIPTION OF THE PREFERRED EMBODIMENTS

Referring now to the drawings, FIG. 1 illustrates a partial longitudinal sectional view wherein the sectional view is taken along the mid axial plane of a fluid filled resilient bushing assembly 10 which embodies the present invention. For clarity, FIG. 2 illustrates an elevational cross-sectional view taken along lines 2—2 of FIG. 1. The bushing assembly 10 includes a cylindrical elongate inner riqid member 14 having an annular bore 16 there through suitable to receive a member (not shown) to connect the bushing assembly 10 to an external structure such as two components of a suspension system. A cylindrical elongate outer rigid sleeve member 20 is concentrically disposed about and radially spaced from the inner member 14 to define an annular space therebetween. In the present embodiment the inner member 14 and the outer sleeve member 20 are made of a cold drawn low carbon steel. Other rigid materials may be used depending on the designers choice.

As shown in FIG. 1, a resilient means 32 is disposed between the inner rIgId member 14 and the outer rigid sleeve member 20. In the present invention the resilient means 32 is molded of elastomeric material such as high temperature natural rubber in a unitary piece which is inserted sealingly combined between the inner and outer members. The inner member 14 and outer 20 are preferably bonded to the resilient means 32. The outer rigid sleeve member 20 has two outer axial edges 22, 24 which are crimped radially inwardly to sealingly secure the resilient means 32 in place.

The resilient means 32 and outer sleeve member 20 define two circumferentially and axially spaced chambers 40, 42 and a spirally disposed restricted passageway 50 fluidly interconnecting the two chambers 40, 42. As shown in FIG. 1, the chambers 40, 42 are on opposite sides of the rigid inner member 14 and are axially spaced such that, the one chamber 40 is located near one end of the bushing assembly 10 and the second chamber 42 is located near the other end of the bushing assembly 10 in an opposed relation about the medial axial plane. Each of the chambers 40, 42 is defined by at least one flexible thin wall 41, 43. The thin wall 41, 43 allows each chamber 40, 42 to expand or contract responsive to vibratory motions.

The restricted passageway 50 is defined by the resilient means 32 and the outer sleeve member 20 wherein the restricted passageway 50 extends spirally about the longitudinal axis of the inner member 14 in the periphery of the resilient means 32 from one chamber 40 to the second chamber 42. In the shown embodiment, the restricted passageway has a semi-circular cross-sectional configuration. The restricted passageway 50 has a port 50a at one end opening into the first chamber 40 and a port 50b at its opposite end opening into the second chamber 42. The cross section area of the chambers 40, 42 is enlarged relative to the cross sectional area of the passageway 50. The pair of chambers 40, 42 and the restricted passageway 50 are filled with a substantially incompressible working fluid (not shown) such as a mixture of ethylene glycol and water.

The efficiency with which the working fluid is displaced between the chambers 40, 42 is affected by the flexibility of the thin wall, 41, 43 which can be defined as volume compliance. This compliance is defined as the ratio of a change in pressure of a chamber to the change in volume caused thereby. Thus, $C = dP/dV$. Thus, when a small change in volume results in a large change in pressure, the compliance is high. It is known that maximum damping occurs when compliance is in resonance with the fluid inertia of the passageway.

The compliance of the thin wall portion 41, 43 of each chamber 40, 42 is greater than that of its adjacent wall portions so that it is capable of being flexed readily by hydrodynamic pressure developed in the chambers in the course of operation of the bushinq assembly 10. In particular, the flexural motion of the thin walls 41, 43 occurs as a result of alternatinq pressure resultinq from the vibratory motions.

The efficiency of the displacement of the working fluid between the chambers 40,42 is also affected by the restructed passageway 50. As shown in FIG. 1, the restructed passageway 50 extends from one chamber 40 to the other chamber 42, extending greater than 360°. The efficiency of the displacement of the working fluid is affected by the inertia ($\rho$1 wherein $\rho$=mass density; 1 =length of passageway; and A=area of passageway) of the fluid and the fluid losses within the restricted passageway. The increased inertia as found in the bushing assembly of the present invention provides for increased flexibility and performance to accommodate lower tuning frequencies and a wide range of vibratory motions.

During operation, vibratory motions in the radial and axial direction represented in FIG. 1 by the arrows A, B respectively cause the working fluid to oscillate in the restricted passageway 50 between the first chamber 40 and the second chamber 42. Oscillation of the fluid acts as a damping effect against the vibratory motion. In FIG. 1, the two chambers 40, 42 are on opposite sides of the rigid inner member 14, lying in a singular radial plane. The chambers 40, 42 are described as being circumferentially spaced by 180°. The vibratory motions along the radial plane of the two chambers 40, 42, induce oscillating movement of the inner member 14 relative to the outer sleeve member 20 causing the working fluid to oscillate in the restricted passageway 50 between the first chamber 40 and the second chamber 42. In particular, when the vibratory motion pushes the inner member 14 towards the outer sleeve member 20 contracting the first chamber 40, the working fluid is pushed from the first chamber 40, through the port 50a into the restricted passageway 50 and on to the expanding second chamber 42. The inertia of the fluid in the passageway 50 causes a resistance to the contraction of the first chamber resulting in a damping affect against the vibratory motion of the inner member 14 towards the outer sleeve member 20. When the vibratory motion reverses and pushes the inner member 14 towards the outer sleeve member 20 the second chamber 42 is contracted, wherein the vibratory motion is dampened by the resistence of the fluid flow through the restricted passageway 50. It is well known that the two chambers may be offset from the 180° circumferentially spacing to provide damping of vibratory motion in two radial directions. Because vibratory motions also occur in the axial direction, it is accordingly advantageous to affect damping in that direction as well.

The present invention satisfies the damping of the vibratory motion in the axial direction B by the use of only two chambers 40, 42 and one restricted passageway 50. Such damping is effected by the axial spacing of the chambers 40, 42 as shown in FIG. 1. Although the chambers 40, 42 are shown to be equally axially spaced about an imaginary medial axial plane, other suitable spacings could be used to effect damping in the axial direction. When a vibratory motion in the axial direction pushes against one end of the busing assembly 10, the left hand side say, the first chamber 40 is contracted in the axial direction, pushing the working fluid from the first chamber 40 through the port 50a into the restricted passageway and on to the expanding second chamber 42. The resistance against the inertia of the fluid in the passageway 50 causes a resistance to the contraction of the first chamber 40 in the axial direction resulting in a damping effect against the vibratory motion in the axial direction. When the vibratory motion is in the reverse direction, the working fluid resists the contraction of the second chamber 42. The damping effect may be suitably controlled by design of the restricted passageway 50 and the axial spacing of the chambers 40, 42.

The manufacture of fluid filled bushing assemblies is well-known to those skilled in the art and may be accomplished by several different methods. Fluid filled bushing assemblies of the present invention are manufactured by separately manufacturing the components and then combining them. In particular, the inner member 14 and outer sleeve member 20 are formed according to standard metal working methods where after the parts are cleaned, a primer and suitable rubber to metal adhesive is applied to surfaces to which rubber will be bonded. The resilient means 32 is molded wherein the chambers 40, 42 and restricted passageway 50 are molded therein. The inner member 14 and sleeve member 20 are assembled around resilient means 32 and the ends crimped in place. The assembly is then placed in a mold and a vulcanizing press. The mold is preheated to a suitable curing temperature dependent on the rubber used. Whereafter the inner member 14, sleeve member 20 and resilient means 32 are suitably sealingly banded together.

After vulcanization, the bushing assembly 10 is demolded, cleaned and readied for finishing. The chambers and the restricted passageway 50 are filled with incompressible fluid through the fill hole whereafter a rubber plug (not shown) is inserted.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teaching of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A fluid filled resilient bushing assembly comprising:
    an elongate inner rigid member substantially concentric about a central longitudinal axis;
    an elongate outer rigid cylindrical sleeve member disposed about and radially spaced from said inner member to define a space therebetween;
    a resilient means disposed about said inner member between said inner rigid member and said outer sleeve member;
    said resilient means defining at least two spaced chambers interconnected by a restricted passageway, said chambers being spaced both circumferentially and in the direction of said longitudinal axis; and an incompressible fluid filling said spaced chambers and said restricted passageway;

wherein said bushing assembly provides damping of vibratory motion due to fluid motion along said longitudinal axis and the radial direction and combinations of longitudinal and radial directions.

2. A fluid filled resilient bushing assembly according to claim 1 wherein said chambers are circumferentially spaced on opposite sides of said control longitudinal axis.

3. A fluid filled resilient bushing assembly according to claim 1 or 2 wherein said restricted passageway is spirally disposed along the length of said resilient means about said inner member.

4. A fluid filled resilient bushing assembly substantially concentric about a central longitudinal axis for vibration control in either the longitudinal direction or radial direction or combination thereof by inducing suitable damping due to fluid motion comprising an elongate inner rigid member concentric about said central longitudinal axis;

an elongate outer rigid cylindrical sleeve member concentrically disposed about and radially spaced from said inner member to define an annular space therebetween;

a resilient means disposed about said inner member between said inner rigid member and said outer sleeve member;

said resilient means together with said outer member defining at least two spaced chambers interconnected by a restricted passageway, said chambers being spaced both circumferentially and in the direction of said longitudinal axis; and an incompressible fluid filling said spaced chambers and said restricted passageway.

5. A fluid filled resilient bushing assembly according to claim 4 wherein said chambers are circumferentially spaced oppositely about said central longitudinal axis adjacent opposite ends of said resilient means.

6. A fluid filled resilient bushing assembly according to claim 4 or 5 wherein said restricted passageway is spirally disposed along the length of said resilient means between said resilient means and said outer member.

7. A fluid filled resilient bushing assembly according to claim 6 wherein said resilient means is elastomer.

8. A fluid filled resilient bushing assembly according to claim 1 or 4 wherein said restricted passageway is defined by said resilient means and said outer member.

9. A fluid filled resilient bushing assembly according to claim 1 wherein the cross section of said chambers is enlarged relative to the cross section of said restricted passageway.

10. A fluid filled resilient bushing assembly consisting essentially of:

an elongate inner rigid member substantially concentric about a central longitudinal axis;

an elongate outer rigid cylindrical sleeve member disposed about and radially spaced from said inner member to define a space therebetween;

a resilient means disposed about said inner member between said inner rigid member and said outer sleeve member;

said resilient means defining at least two spaced chambers interconnected by a restricted passageway, said chambers being spaced both circumferentially and in the direction of said longitudinal axis; and an incompressible fluid filling said spaced chambers and said restricted passageway;

wherein said bushing assembly provides damping of vibration motion due to fluid-motion along said longitudinal axis and in the radial direction and combinations of longitudinal and radial directions.

11. A fluid filled resilient bushing assembly according to claim 1 wherein said chambers are circumferentially spaced on opposite sides of said central longitudinal axis.

12. A fluid filled resilient bushing assembly according to claim 1 or 2 wherein said restricted passageway is spirally disposed along the length of said resilient means about said inner member.

* * * * *

UNITED STATES PATENT OFFICE
CERTIFICATE OF CORRECTION

PATENT NO. : 4,964,623

DATED : Oct. 23, 1990

INVENTOR(S) : Richard P. Thorn, Erie, Pa.

It is certified that error appears in the above-identified patent and that said Letters Patent is hereby corrected as shown below:

Col. 5, line 7, change "alternatinq pressure resultinq" to --alternating pressure resulting--.

Col. 5, line 15, change "pl" to --$\underline{p1}$--.

Col. 7, line 9,
Claim 2, line 3, change "control" to --central--.

(A above "Claim 2")

Signed and Sealed this

Tenth Day of March, 1992

Attest:

HARRY F. MANBECK, JR.

*Attesting Officer*     *Commissioner of Patents and Trademarks*